Nov. 4, 1930. J. G. BARCLAY ET AL 1,780,857
ENGINE DRAIN OR COMPRESSION RELIEF VALVE
Filed Dec. 18, 1929  2 Sheets-Sheet 1

INVENTORS
J. G. BARCLAY
C. T. BARCLAY

Nov. 4, 1930.  J. G. BARCLAY ET AL  1,780,857
ENGINE DRAIN OR COMPRESSION RELIEF VALVE
Filed Dec. 18, 1929  2 Sheets-Sheet 2
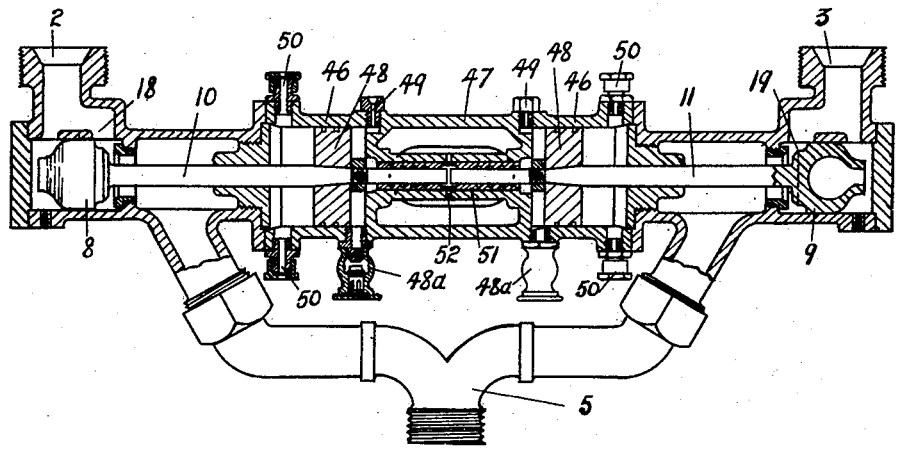
Fig.5.
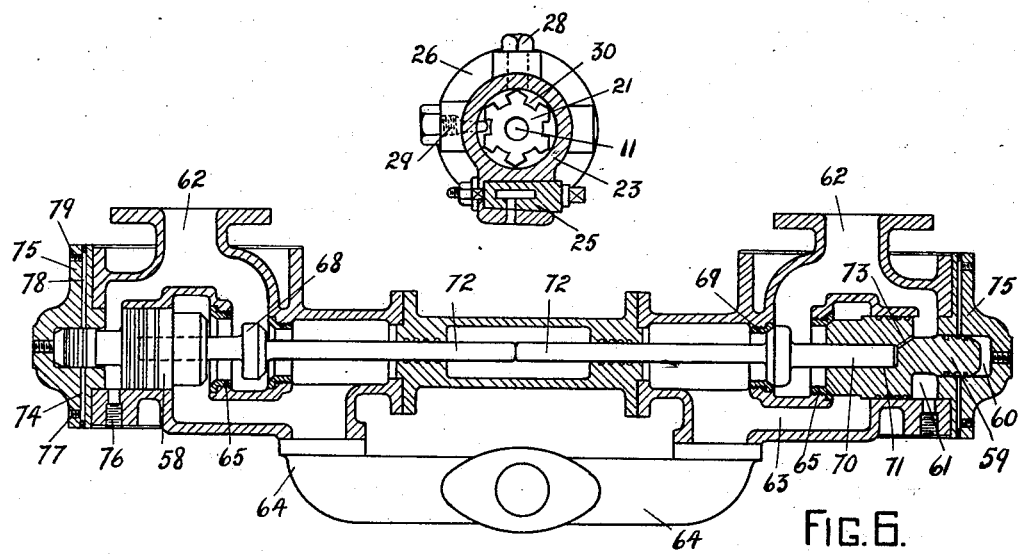
Fig.2.
Fig.6.
INVENTORS
J. G. BARCLAY
C. T. BARCLAY
BY [signature] ATTY Patented Nov. 4, 1930

1,780,857

UNITED STATES PATENT OFFICE

JOHN GALILEO BARCLAY AND COLIN THOMSON BARCLAY, OF KILMARNOCK, SCOTLAND

ENGINE DRAIN OR COMPRESSION-RELIEF VALVE

Application filed December 18, 1929, Serial No. 415,086, and in Great Britain October 22, 1928.

This invention relates to high-speed steam or compressed-air engines or locomotive or other engines using a pressure fluid as the working medium, and relates more particularly to valves for reducing the back-pressure of the exhaust, for relieving the compression in the engine cylinder, or for draining the engine cylinder of condensed steam or other condensation liquid.

It is one of the objects of the present invention to minimize or eliminate the hammering of the valve on its valve seat owing to the sudden closing of the valve under the pressure of the live steam or other fluid admitted to the engine cylinder during the working stroke of the engine piston.

The invention contemplates the provision of a dash-pot, cataract, or like pneumatic or other fluid brake connected to the valve or valve spindle.

The present invention also contemplates reducing the effective area of the head of the valve upon which the live steam (or other fluid) acts, the said area being reduced to such an extent that the pressure on the head of the valve effects substantially silent closing of the valve, thus avoiding the aforesaid hammering effect.

The present invention also consists in constructing the valve of the valve apparatus in the form of a duplex or multiple valve such as a double-beat, triple-beat or multiple-beat valve, the valve faces of the valve members controlling separate ports or valve seats, which through suitable passages establish communication between the end of the engine cylinder and the exhaust passage or drain passage.

The invention further consists in permitting automatic adjustment of the valve faces of the multiple or duplex valve, thus ensuring that all the valve faces will bed firmly upon their corresponding valve seats when the valve is closed and thus prevent any leakage of live steam or other working fluid in the closed position of the valve. This adjustment may conveniently be permitted by making the valve faces on separate abutting valve members and providing a slight clearance between the valve members.

The present invention is applicable to interconnected or compounded back-pressure relief or drain valves for double-acting engines as well as to independently operating relief valves or drain valves, but for convenience in explanation it is hereinafter described as applied by way of example to an interconnected or compounded relief or drain valve of the kind in which two valves are coaxially mounted in valve chambers which communicate with the ends of the cylinder of a double-acting reciprocating engine and with a common exhaust passage or drain passage, the valves being operated by the steam or other fluid pressure in such manner that one valve is opened when the other is closed.

Reference will now be made to the accompanying drawings whereon

Fig. 2 is a sectional view on the line 2—2 of Fig. 1, the piston being omitted.

Figure 4:
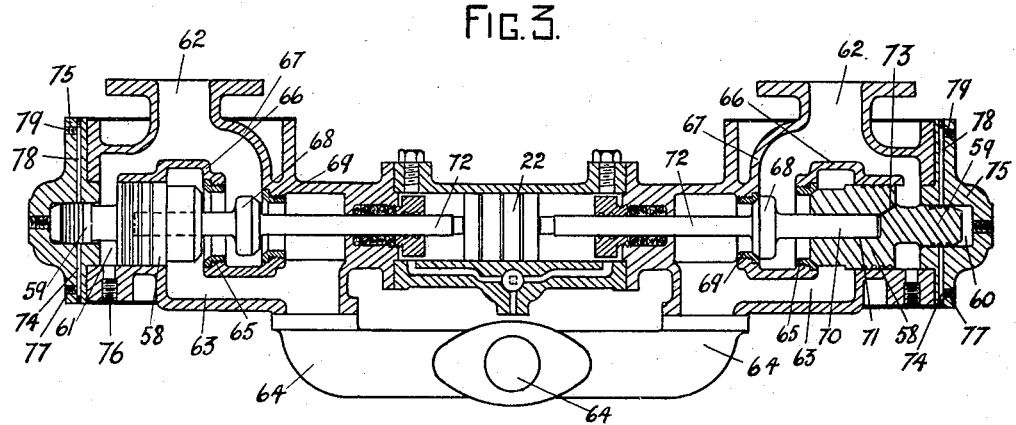

Fig. 4 is a cross-sectional view illustrating the application of a double-beat valve to a back-pressure relief or drain valve apparatus. Fig. 5 illustrates an adaptation of our invention in which the valve spindles of the drain valve apparatus shown in longitudinal section are each fitted with a dash-pot. Figure 6 is a view in section, partly in elevation, illustrating the use of auxiliary valves.

Figure 1:
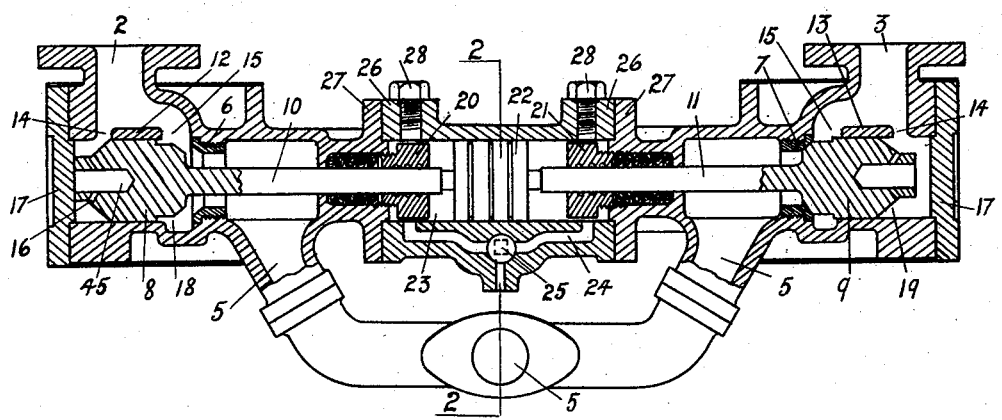
Fig. 1 is a cross sectional view of a compound or interconnected back pressure relief or drain valve with a liquid dash pot.

In the example of carrying out our invention as applied to an interconnected or compound back-pressure relief or drain valve shown in Figs. 1 and 2, for double-acting high speed reciprocating engines, two valves 8 and 9 are coaxially mounted in valve chambers 18 and 19 which communicate by means of inlet ports 2 and 3 with the ends of the engine cylinder and with a common exhaust or drain passage 5 and are operated by the steam or other fluid pressure in such a manner that one valve is opened when the other is closed. The valves 8 and 9 are fitted with spindles 10 and 11 guided in bearings 20 and 21 screwed into the ends of valve chambers 18 and 19, the ends of the spindles abutting against the two end faces of a piston 22 loosely interposed between the two valve spindles, the piston 22 working in an oil or liquid dash pot cylinder 23 closed at each end by means of the bearings 20 and 21 which may be in the form of stuffing glands as shown. The two ends of the oil or liquid cylinder 23 are connected by a bye-pass connection 24 which may be fitted with a control cock 25 to regulate the passage of the liquid from one side of the piston to the other.

The valves 18 and 19 cooperate with valve seats 6 and 7 which control communication between the inlet ports 2 and 3 and the drain passage 5. The valves 18 and 19 are each of the trunk type and work within cylindrical valve chambers formed by partitions 12 and 13 at each end of the apparatus. Each valve chamber has ports 14 and 15 leading from the inlet port to opposite sides of the valve so that, when the valve 8 is open and exhausting fluid enters the inlet port 2 leading to valve 8, the said exhausting fluid escapes through the valve seat 6 into the drain passage 5, the main flow pressure on the head of the opposite valve 9 having closed the latter on to the valve seat 7. The closing movement of one valve operates to open the other valve by reason of the coaxial spindles 10 and 11 abutting on the piston 22.

The valve head strikes against a plug 17 when the valve opens. In consequence thereof the area of the head of the valve acted upon by live steam may be insufficient to close the valve. Each valve is therefore preferably made with a recess 45 in the head and with one or more ports 16 through the head in order to admit live steam into the interior of the valve for closing it on to its seat.

The oil or liquid cylinder 23 may form a distance piece between the two valve chambers 18 and 19 and may be connected to the valve chambers by bolts, studs, or the like passing through flanges 26 and 27 formed on the ends of the cylinder and valve chambers respectively. Charging plugs 28 are fitted in the top of the dash pot cylinder one at each end of the cylinder in order that the cylinder may be kept full of oil or liquid.

The heads of the stuffing glands or bearings 20 and 21 are preferably made with grooves or notches 30 into which a locking pin 29 is adapted to be inserted so as to prevent the glands from working loose, the pins 29 being fitted through screwed holes in the ends of the dash pot cylinder 23.

The piston 22 may be formed with passages through it from one face to the other in order to allow restricted passage of the liquid from one side of the piston to the other.

Figure 3:
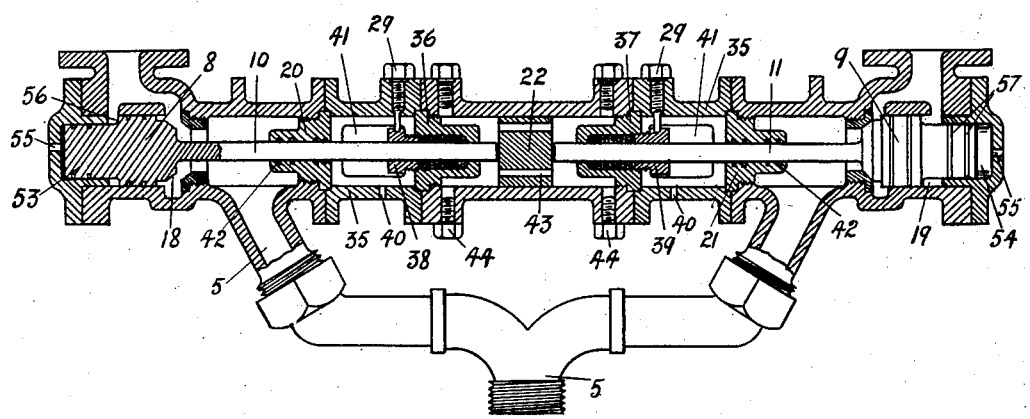
Fig. 3 is a cross-sectional view showing a modified form of back-pressure relief or drain valve apparatus.

In the form shown in Fig. 3, the valve is constructed with distance pieces 35 fitted between the valve chambers 18 and 19 and the dash pot cylinder 23 containing the piston 22 against the end faces of which the ends of the spindles 10 and 11 of the valves abut. The bearings 20 and 21 serve to close the ends of the valve chambers 18 and 19 and similar bearings 36 and 37 are adapted for closing the ends of the dash pot cylinder 23 but the bearings 36 and 37 may also be fitted with stuffing glands 38 and 39 constructed similar to the stuffing glands 20 and 21 shown in Figs. 1 and 2. The piston 22 is provided with passages 43 through it from one end face of the piston to the other in order to allow restricted passage of the liquid from one side of the piston to the other, the number and size of the passages being arranged to suit the pressure of live steam admitted to the valves.

Drain plugs 44 may be fitted at each end of the dash pot cylinder 23 to allow the oil or liquid therein to be run off and drain holes 40 may be made in the bottom of the distance pieces 35 to drain off any liquid which may creep past the bearings or stuffing glands. Apertures 41 may also be made in the side of the distance pieces 35 to admit access to the stuffing glands 38 and 39 without disjointing the distance pieces 35 from the cylinder 23. The stuffing gland locking pins 29 in this case are fitted through the wall of the distance piece 35.

The bearings of the valve spindles may be made reasonably liquid-tight by the provision of annular grooves 42 or labyrinth packing.

It is to be understood that any known type of dash pot, cataract, or like fluid-braking device may be associated with the valve spindles. For example, it is not necessary that the two spindles 10 and 11 should abut against an intermediate dash-pot piston 22. Each spindle may be fitted with its own dash-pot piston working in its own dash-pot cylinder. Such an arrangement is shown in Fig. 5 wherein two dash-pot cylinders 46 are provided, each interposed between one end of a distance piece 47 and the valve chamber 18 or 19. Each valve spindle 10 and 11 carries its own piston 48 which works in one of the cylinders 46 and each cylinder has at one end a self-closing inlet valve 48[a] and a fixed or regulatable leak passage 49. The leak passage 49 may also serve as an inlet aperture, thereby dispensing with the inlet valve 48[a]. The other end of each dash-pot cylinder 46 is fitted with one or more relief passages or outlet connections 50 which may also serve to drain off any liquid which may creep along the valve spindle into the cylinder 46. The distance piece 47 may be either integral with or separate from the cylinders 46 and is formed with a central hollow bearing 51 for the abutting ends of the valve spinpassage from one end of the dashpot cylinder to the other.

2. A compound back-pressure relief or drain valve apparatus for a double-acting reciprocating engine comprising a pair of coaxial valve chambers communicating with the ends of the cylinder, a common outlet passage connecting said valve chambers, coaxial valves, one in each chamber, each valve being adapted to close upon a seat formed between the valve chamber and the outlet passage, a valve spindle connected to each valve, a piston against which both of said spindles abut, and a dashpot cylinder in which said piston is situated.

3. A relief or drain valve apparatus for a reciprocating engine comprising a valve chamber having a plurality of inlet ports, each communicating with an inlet passage connected to the engine cylinder, one of said ports communicating with an enclosed space at the end of said chamber, a plurality of coaxial outlet ports in said chamber and coaxial therewith, each outlet port being constituted by a valve seat, a plurality of coaxial valve elements, each adapted to seat upon one of said valve seats, one of said valve elements being constituted by a trunk piston which forms one confining wall of said enclosed space, said valve elements being operatively associated to simultaneously close upon their seats under the pressure of fluid admitted to said enclosed space, and automatic means for lifting said valve elements off their seats.

4. Apparatus as specified in claim 3 wherein said valve elements are adapted to abut against each other, a slight clearance being provided between the valve elements to enable each valve element to automatically adjust itself to its valve seat.

5. A relief or drain valve apparatus for a reciprocating engine comprising a valve chamber having inlet ports at opposite ends, each communicating with an inlet passage connected to the engine cylinder, a main valve movable between said inlet ports and adapted to seat upon a valve seat in a transverse wall across said chamber, an outlet port opening into said chamber between said inlet ports, a second valve coaxial with the main valve and adapted to seat upon a valve seat forming an outlet port in the end of said valve chamber, said valves being provided with a slight clearance between them and being adapted to abut against each other during their closing movement, and automatic means for lifting said valves off their seats.

6. Apparatus as specified in claim 5 wherein the main valve is of the trunk type and formed with a central recess to receive a coaxial extension rearwards of the second valve.

7. Apparatus as specified in claim 5 wherein the main valve is provided with a rearward reduced extension slidably received in a guide chamber open beyond said extension to the atmosphere.

8. A compound back-pressure relief or drain valve apparatus for a double-acting reciprocating engine comprising a pair of coaxial valve chambers, each having a plurality of inlet ports communicating with an inlet passage connected to one end of the cylinder, one of said inlet ports opening into an enclosed space at one end of its valve chamber, a plurality of coaxial valve seats in each chamber, each valve seat communicating with its own outlet passage, a common outlet connection between the outlet passages of both valve chambers, a plurality of coaxial valve elements each adapted to seat upon one of said valve seats, one of said valve elements in each chamber being constituted by a trunk piston which forms one confining wall of said enclosed space, and means interposed between the valve elements of one chamber and those of the other chamber whereby the valve elements in one chamber are opened when the valve elements of the other chamber are closed.

9. Apparatus as specified in claim 8 having a fluid brake associated with the valve elements for minimizing the hammering of said elements upon their valve seats.

10. Apparatus as specified in claim 8 wherein the means interposed between the two sets of valve elements comprises a pair of valve spindles extending towards each other and each connected to a valve element of one set, a piston interposed between and forming an abutment for said valve spindles, and a dashpot cylinder in which said piston is movable.

Signed at Glasgow, Scotland this 27th day of November A. D. 1929.

JOHN G. BARCLAY.
COLIN T. BARCLAY.

dles. Ports 52 in the bearing 51 are provided to drain off any liquid which creeps past the pistons 48 to the abutting ends of the valve spindles.

In order to still further minimize or wholly eliminate the hammering of the valves upon their seats, it is preferred to reduce the effective area of the head of the valve, as hereinafter described with reference to Fig. 3 of the accompanying drawings. As shown in Fig. 3 the effective area of the head of the valve is reduced by the provision on the valve 8 or 9 of a reduced extension 53 working in a guide chamber 54 which is open to atmosphere through an aperture 55. The effective area of the head of the valve is then constituted by the shoulder 56 formed between the head of the valve and its extension 53. The said extension may be cylindrical and work in a cylindrical guide chamber 54. The aperture 55 opens said chamber to atmosphere and prevents any steam which may leak through into chamber 54 from acting on the end of the extension 53. The extension 53 or the chamber 54 or both may be fitted with annular grooves or packing rings 57 to prevent undue leakage of steam past the extension 53.

As shown in Fig. 4, each valve may be constructed in the form of a valve having a plurality of valve faces, each having its own port or valve seat controlling communication between the inlet port 2 or 3 and the drain passage 5.

In the construction shown in Fig. 4 there are two main valves 58, each of which may be either constructed as a hollow ported trunk valve similar to the valves 8 and 9 shown in Fig. 1 or Fig. 5, but they are preferably each provided with an extension 59 working in a guide chamber 60 as described with reference to Fig. 3 of the drawings. The valves 58 are coaxially mounted in valve chambers 61, each of which communicates by means of an inlet port 62 with one end of the engine cylinder. Both valve chambers 61 also communicate by way of outlet connections 63 with a common exhaust passage or drain passage 64. Each of the valves 58 is adapted to seat upon a valve seat 65 formed at one end of a cylindrical valve chamber formed by a partition 66 in the valve casing 67. The valve seat 65 forms a port or passage between the inlet port 62 and the outlet connection 63. Within the valve casing 67 and preferably coaxial with the main valve 58 is a second or auxiliary valve 68 adapted to seat upon a second valve seat 69 which also forms a port or passage between the inlet port 62 and the outlet connection 63. The auxiliary valve 68 may be fixed to or integral with the main valve 58 so that the two valves close together, but it is preferred to provide a slight clearance between the valves 58 and 68 so that the closing movement of valve 58 will cause it to abut against valve 68 to close the latter, so that both valves will close tight upon their valve seats and thus prevent any leakage of pressure fluid to the outlet connection 63 when the valves are closed. The auxiliary valve 68 may, as shown in Fig. 4, be provided with a coaxial extension 70 fitting into a recess 71 in the main valve 58.

In order that the valves at one end of the apparatus will open when the valves at the other end close, the auxiliary valves 68 may be fitted upon or abut against the ends of a valve spindle extending between the two auxiliary valves, but it is preferred to make the spindle in two halves 72 which either abut upon each other as shown in Fig. 6 or abut against a dashpot piston 22 as shown in Fig. 4 and described with reference to Figs. 1 and 3 of the drawings.

Although we have only shown two valves 58 and 68 at each end of the drain valve apparatus illustrated in Fig. 4, it will be manifest from the foregoing description that any number of auxiliary valves may be used in conjunction with a main valve and either integral with the main valve or separate therefrom, each valve member having its own valve seat.

As shown in Fig. 4, the main valve 58 may be provided with a passage 73 to drain the recess 71 of any steam or condensed liquid which might otherwise be trapped therein by the valve extension 70. Passages 74 and 78 plugged at their ends are also provided in the end caps 75 and apertures 77 and 79 are provided in the end caps 75 for communication with the passages 74 and 78 respectively. Drain cocks (not shown) may be screwed into the apertures 77, and lubricating cups (not shown) may be fitted to the apertures 79. A blow-through drain aperture 76 may also be provided for each valve chamber 61. This aperture 76 may be connected to a drain cock (not shown) so that steam may be blown through the valve chamber 61 for cleaning purposes.

Claims.

1. A compound back-pressure relief or drain valve apparatus for a double-acting reciprocating engine comprising a pair of coaxial valve chambers communicating with the ends of the cylinder, a common outlet passage connecting said valve chambers, coaxial valves, one in each chamber, each valve being adapted to close upon a seat formed between the valve chamber and the outlet passage, means interposed between said valves whereby either valve is opened when the other is closed, said means including a dashpot piston moving with the valves, a dashpot cylinder in which said piston moves, a bye-pass passage connecting the two ends of said dashpot cylinder, a valve for controlling the flow of fluid through said bye-pass